Aug. 9, 1932.   M. D. BROADFIELD   1,871,416
METHOD OF PRODUCING SUPERPHOSPHATE
Filed Jan. 27, 1931
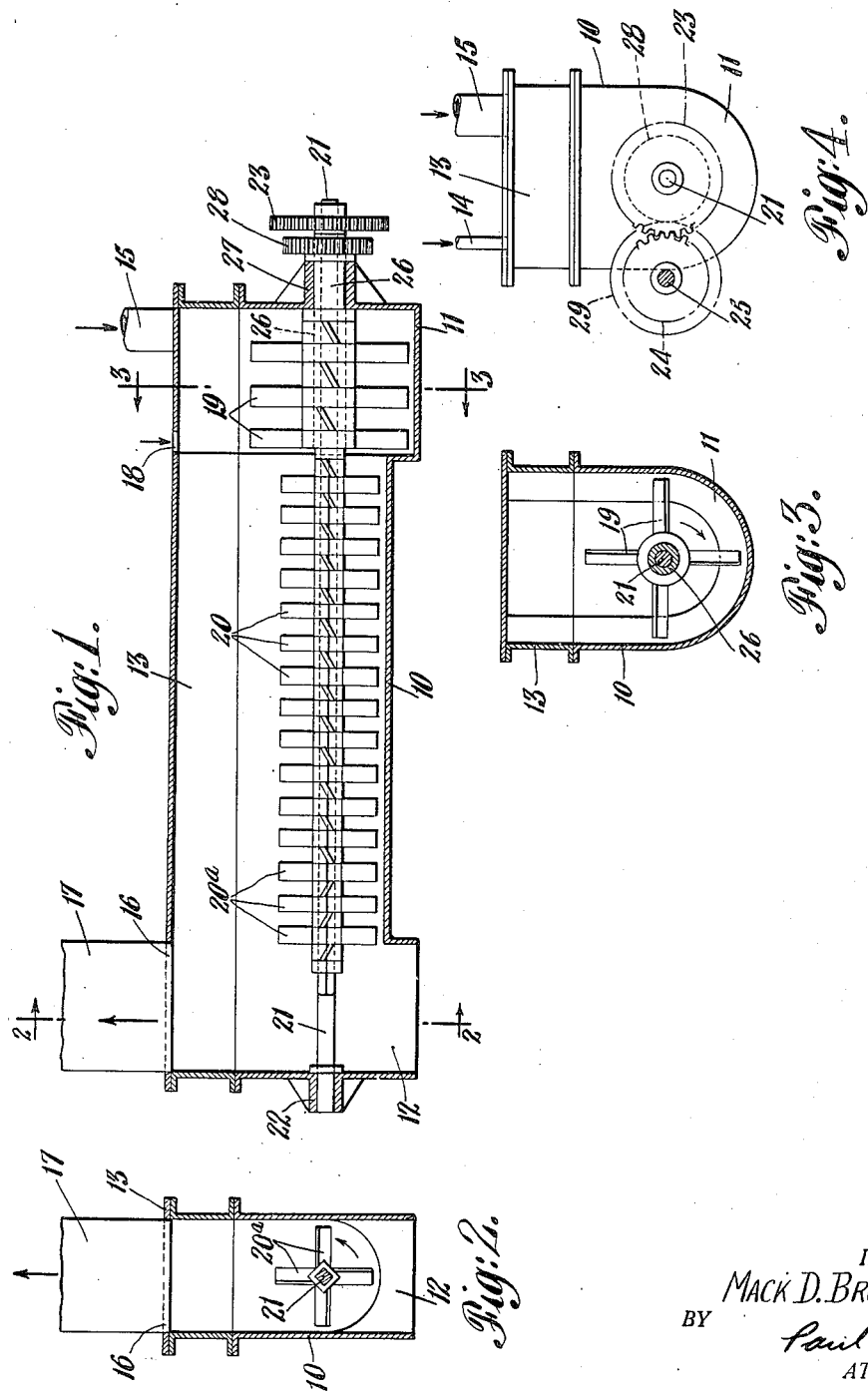
INVENTOR.
MACK D. BROADFIELD
BY
Paul R. Ames
ATTORNEYS.

Patented Aug. 9, 1932

1,871,416

UNITED STATES PATENT OFFICE

MACK DEAN BROADFIELD, OF VALDOSTA, GEORGIA

METHOD OF PRODUCING SUPERPHOSPHATE

Application filed January 27, 1931. Serial No. 511,473.

This invention relates to the acidulation of phosphate rock and more particularly to an improvement in the method and apparatus for producing soluble phosphates by the reaction of sulphuric acid upon pulverized phosphate rock.

It has been the usual practice in this art to rapidly mix the sulphuric acid with the ground or pulverized phosphate rock in relatively large batches in a batch mixer, although in some cases it has been suggested that the mixing be carried on continuously. In order to avoid solidification of the materials in the mixer, whether a batch or continuous mixing operation is used, it has been customary to use enough relatively dilute acid in relation to the pulverized rock to form a liquid mass, and to mix the two rapidly and discharge them immediately thereafter, and while still in a liquid condition, into a stationary or moving curing den.

Sometimes a moderate fan draft has been applied during the mixing operation to withdraw vapors liberated in this operation, but in following such practice it has been necessary to use a very low fan draft in order to minimize the loss of rock dust from above the mixture during the rapid mixing.

Because of the fact that the ingredients are mixed very rapidly in the above procedure and are immediately dumped into the den, the main portion of the reaction takes place while the mass is at rest in the curing den. This results in confining a large part of the gases evolved by the reactions, within the solidified mass which is discharged as a porous spongy mass. A portion of this confined gas is liberated when the mass is disintegrated, but a considerable part of it is retained in the material placed on the storage pile for final curing. The gases confined in this manner in the storage pile include fluorides and other ingredients, which appear to form a binder that causes the product to solidify in the storage pile, so that it cannot be readily handled with a phosphate drag unless the product before being placed on the storage pile has been treated for conditioning by any well known means, which do not herein have to be specified.

As indicated above, it has been the practice to use a dilute acid (52 to 53° Bé.) in order to make the mixture sufficiently liquid to pass readily into the curing den and to prevent it from hardening in the mixer. If stronger acid were used with this procedure, it would be necessary to add the same quantity of liquid, and consequently a greater quantity of actual acid, in order to make the mass sufficiently fluid to be discharged from the mixer. The excess of acid left in the mass in following this operation would be objectionable in the finished product and would make the procedure uneconomical because of waste of acid. Attempts have been made in some cases to correct for this excess acid by adding dry ground phosphate rock to the mass during the curing or after the mass from the den has been disintegrated but this requires an additional step and does not result in complete reaction between the acid and the extra rock dust so added. The use of stronger acid has also been considered objectionable because of the formation of an insoluble coating on the particles, which coating is very difficultly soluble in the acid and prevents complete reaction with the particles.

It is an object of this invention to provide an improved process and apparatus whereby the above objectionable features may be eliminated. It is a further object to provide an improved procedure by which a greater percentage of available phosphoric acid may be obtained in the finished product from a phosphate rock of a given bone phosphate of lime content. Another object is to provide an improved procedure in which the reacting materials may be agitated and kneaded after the initial mixing in order to bring about more intimate contact between the ingredients and to liberate gases formed by the reactions. A further object is to more completely remove the gases liberated during the reaction. Another object is to provide an apparatus for conveniently mixing and kneading the acid and ground phosphate rock and to provide means for withdrawing the gases liberated while the reactions are taking place in the mixture. It is also an object to produce an acid phosphate of improved characteristics. Other objects will become apparent.

In referring to the invention, reference will be made to the drawing in which Figure 1 is a section through a kneader suitable for use in carrying out my improved procedure. Figure 2 is a section taken on the line 2—2 of Figure 1. Figure 3 is a section taken on the line 3—3 of Figure 1 and Figure 4 is an end view of the mixer from the right hand side of Figure 1.

The mixer is made up of a lower casing 10 which may be of cast iron and which has a cylindrically shaped bottom with an enlarged section 11 at one end and a discharge outlet 12 at the other end. A cover 13, which may be of wood, closes the top of the section 10 and is provided with inlets 14 and 15, over the enlarged section 11, for introducing acid and pulverized rock, respectively. At the other end of the cover 13 an outlet 16 is provided for the gases liberated during the reaction. This outlet communicates through a pipe 17 with a suitable suction fan (not shown). An opening 18 is also provided in the cover 13 at a point near the outlet end of the enlarged section 11.

Two separately operable groups of paddles 19 and 20 are positioned to rotate within the mixing and kneading sections, respectively, of the casing 10. The paddles 20 are fixed to the shaft 21, which is supported at one end in the bearing 22 and which is driven by the gear 23 fixed to its other end, which gear meshes with the gear 24 fixed to the main drive shaft 25. The drive shaft 25 may be driven at a constant speed by any suitable means (not shown). The paddles 19 are fixed to a sleeve 26 adapted to rotate on the shaft 21. The sleeve 26 extends through its bearing 27 in the casing 10 and acts itself as a bearing for the end portion of the shaft 21. A gear 28 is fixed to the outer end of the sleeve 26, which gear meshes with a gear 29, also fixed to the drive shaft 25.

The paddles 19 are set at an angle to the axis of the sleeve 26 so that a clockwise rotation of these paddles, as viewed in Figure 3, will not only mix the pulverized rock dust and acid, but will advance it toward the kneader section. The paddles 20 are also positioned at an angle so that a clockwise rotation of the shaft 21 will advance the mass while the reacting mixture is agitated and mixed. Some of the paddles, for example, paddles 20a, may be set at a reverse angle so that they will retard the progress of the mass through the kneader. The particular arrangement of the paddles 19, 20 and 20a and the gearing for driving the shaft 21 and sleeve 26 may be adjusted to give the desired rate of mixing and discharge and to mix and knead the mass for the desired length of time. Also the shape of the paddles and the contour of the casing 10 may be modified to give the desired mixing and kneading action.

No claim is made in this application to the above apparatus, which is being claimed in applicant's copending application Serial No. 583,324, filed December 26, 1931.

In operating according to my improved process with the apparatus described above, the shaft 21 and the sleeve 26 are rotated in a clockwise direction at the desired speed and preferably with the sleeve operating at a higher rate of speed to assure rapid mixing of the pulverized rock and acid, for example, the shaft 21 may rotate at about 65 R. P. M. and the sleeve 26 at about 130 R. P. M. The acid and pulverized phosphate rock are fed continuously through the feed pipes 14 and 15 at the rate of about 150 pounds of 56 to 57° Bé. acid and about 200 pounds pulverized phosphate rock per minute. These may be supplied to the mixer as described in my copending application 418,455, filed January 4, 1930, of which this application is a continuation in part, wherein the acid is continuously supplied in measured quantities through a measuring valve in a constant head supply tank and the pulverized rock is supplied substantially continuously through a rotating pocket-type of measuring feeder. Of course, other means may be used for continuously feeding the rock dust and acid.

The rotation of the paddles 19 rapidly mix the rock dust and acid which are retained in the enlarged section 11 of the casing 10 a sufficient length of time to thoroughly mix them. The mixture is then advanced into the kneader where the paddles 20 continuously mix and knead the mass as they advance it toward the discharge 12. The paddles 20 and 20a are arranged so that the mass is discharged from the kneader in such a condition that it is substantially ready to solidify, due to the formation of hydrated calcium sulphate from the reaction of the acid upon the tri-calcium phosphates. In the operation described above, I prefer to retain the mass in the enlarged portion of the casing 10 about 2 minutes and in the kneader about 3 minutes.

The kneaded mass is discharged continuously into a curing den which may be a stationary den or a moving den, for example, of the type described in my above mentioned copending application 418,455. If a continuously moving den is used, the solidified mass may be disintegrated at the discharge end of the den by means of a revolving cutter or other suitable means.

During the operation of the mixer the mass is maintained at about the level of the shaft 21. The gases evolved during the mixing are withdrawn through the pipe 17 by a strong fan blast, the opening 18 permitting the entrance of a stream of air which assists in sweeping out the gases. With this arrangement a strong fan blast may be used without loss of rock dust because the blast is applied with greatest force to the material after the rock dust has become mixed with the liquid to form a wet mass, and any dust that may be drawn from the stream of pulverized rock entering the mixer will be removed by the subsequent contact with the agitated mass thrown up by the revolving paddles. The curing den and cutter may be in an enclosure communicating with the discharge opening 12, in which event the fan blast will draw off any slight amount of gas liberated in the den and during the cutting operation.

Because of the fact that the gases are liberated during the kneading and are completely withdrawn by a strong fan blast, very little gas is retained in the mass discharged from the curing den and this mass, instead of being a porous mass, is a dense mass which does not require any further step for conditioning and can be readily handled with a phosphate drag.

In following my improved procedure, the ratio of rock dust to acid (expressed as 50° Bé. acid) is higher than in the usual procedure, for example, I have used a ratio of 1.15 pounds of rock dust to one of acid as compared to 1.04 pounds to one in the old procedure. The thorough mixing and kneading of a greater proportion of pulverized phosphate rock with the more concentrated acid results in the production, from a given phosphate rock, of a product containing a higher percentage of available phosphoric acid. ($P_2O_5$). For example, I have used phosphate rock containing 68% bone phosphate of lime (31.12% phosphoric acid calculated as $P_2O_5$). Consequently 1.15# of this rock contains about .358# of $P_2O_5$. For this amount of phosphate rock I have used the equivalent of 1# of 50° Bé. acid which contains about .203# of combined sulphur, giving a ratio of about 1.76# of $P_2O_5$ to 1# of sulphur, and as my conversion of insoluble phosphate to soluble or available phosphate was not less than 97%, the ratio of available phosphoric acid (as $P_2O_5$) to sulphur in the resultant product was not less than about 1.7 to 1. as compared to 1.54 to 1. in the prior practice. Also, since less water is present in the ingredients and a more thorough separation of the steam during the reaction is provided, the product is drier than that produced by the usual procedure. The smaller quantity of water present during the reaction also results in a higher temperature in the reacting mass and an increase in the speed of the reaction.

The apparatus and procedure may, of course, be modified and it is not intended to limit it to the particular embodiments described. For example, the initial mixing may be carried out in a batch mixer, after which the mixture can be passed through a kneader where it is agitated and kneaded until the desired reactions have taken place.

The terms used in describing and claiming the invention have been used in their descriptive sense and not as terms of limitation and it is intended that all their equivalents be included within the scope of the appended claims.

What I claim is:

1. In the method of producing calcium acid phosphate, the step which comprises kneading the mass produced by the admixture of phosphate rock and sulphuric acid.

2. The process of producing superphosphate which comprises digesting phosphate rock and sulphuric acid and then kneading the plastic digested mass while still warm from the heat of the reaction.

3. The process of producing superphosphate which comprises mixing phosphate rock and sulphuric acid and kneading the resulting admixture after substantial crystallization of calcium sulphate.

4. A method for producing soluble phosphate from phosphate rock, comprising mixing acid with pulverized phosphate rock to form a liquid mass, continuously advancing the mass while retarding its forward movement to thoroughly knead the mixture during the reaction.

5. A method for producing soluble phosphate from phosphate rock, comprising mixing acid with pulverized phosphate rock, kneading the mixture against a back pressure and drawing a stream of air across the surface of the mixture to remove the gases liberated during the mixing and kneading.

6. A method for producing soluble phosphate from phosphate rock, comprising mixing acid with pulverized phosphate rock and kneading the mass against a back pressure until it is almost solidified.

7. A method for producing soluble phosphate from phosphate rock, comprising mixing concentrated sulphuric acid with pulverized phosphate rock to form a wet mass and thereafter kneading the mixture against a back pressure until the calcium sulphate has crystallized out to such an extent that the mass is almost solidified.

8. A method for producing soluble phosphate from phosphate rock, comprising mixing about 56° Bé. sulphuric acid with pulverized phosphate rock in the ratio of about one part of acid, expressed as 50° Baumé acid, to 1.15 parts of pulverized rock, kneading the wet mass until it has almost solidified, withdrawing the gases evolved during the kneading and curing the mass to substantially complete the conversion.

9. A method for producing soluble phosphate from phosphate rock comprising continuously mixing acid with pulverized phosphate rock to form a liquid mass, continuously advancing the mass while retarding its forward movement to thoroughly knead the resultant mixture and reducing the partial pressure of gases evolved during the kneading to facilitate their removal from the mass.

10. A method for producing soluble phosphate from phosphate rock, comprising continuously mixing concentrated sulphuric acid with ground phosphate rock to form a wet mass, and thereafter kneading the mass against a back pressure until it has almost solidified, and curing the mass to substantially complete the conversion.

11. A method for producing soluble phosphate from phosphate rock, comprising mixing sulphuric acid with pulverized phosphate rock and thoroughly kneading the mass against a retarding force after substantial crystallization of the calcium sulphate.

12. A method for producing soluble phosphate from phosphate rock, comprising mixing sulphuric acid with pulverized phosphate rock, thoroughly kneading the mass against a retarding force after substantial crystallization of the calcium sulphate and drawing off the gases liberated during the kneading.

13. A method for producing soluble phosphate from phosphate rock, comprising mixing 56–57° Baumé sulphuric acid with pulverized phosphate rock and kneading the wet mass after substantial crystallization of calcium sulphate.

14. A method for producing soluble phosphate from phosphate rock, comprising mixing sulphuric acid of a concentration higher than 53° Bé. with pulverized phosphate rock in the proportions of more than 1.55 parts $P_2O_5$ to 1. part of combined sulphur and kneading the wet plastic mass after substantial crystallization of calcium sulphate.

15. A method for producing soluble phosphate from phosphate rock comprising mixing 56–57° Baumé sulphuric acid with pulverized phosphate rock in the proportions of more than about 1.55 parts of $P_2O_5$ to 1. part of combined sulphur and thoroughly kneading the wet mass against a back pressure.

16. A method for producing soluble phosphate from phosphate rock comprising mixing 56–57° Baumé sulphuric acid with pulverized phosphate rock in the proportions of about 1.7–1.8 parts of $P_2O_5$ to 1. part of combined sulphur and thoroughly kneading the wet plastic mass after substantial crystallization of calcium sulphate.

17. A method for producing soluble phosphate from phosphate rock comprising rapidly mixing sulphuric acid with pulverized phosphate rock, thoroughly kneading the wet plastic mass after substantial crystallization of calcium sulphate, discharging the mass and disintegrating it after it solidifies.

18. A method for producing soluble phosphate from phosphate rock comprising rapidly mixing concentrated sulphuric acid with pulverized phosphate rock and kneading the wet mass against a back pressure, the mixing and kneading being continued for at least 5 minutes.

19. A method for producing soluble phosphate from phosphate rock comprising mixing concentrated sulphuric acid with pulverized phosphate rock and thereafter kneading the wet mass for about 3 minutes and discharging it while still plastic.

20. A method for producing soluble phosphate from phosphate rock comprising mixing concentrated sulphuric acid with pulverized phosphate rock, continuously advancing and kneading the wet mass against a reversed movement of a portion of the mass and continuously discharging the mass after the kneading.

In testimony whereof, I have signed my name to this specification this 22nd day of January, 1931.

MACK DEAN BROADFIELD.